US009177284B2

(12) United States Patent
Gandhi et al.

(10) Patent No.: US 9,177,284 B2
(45) Date of Patent: Nov. 3, 2015

(54) INSTANT CONVERSATION IN A THREAD OF AN ONLINE DISCUSSION FORUM

(75) Inventors: Shruti Gandhi, Poughkeepsie, NY (US); Angela Richards Jones, Durham, NC (US); Pamela Ann Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1956 days.

(21) Appl. No.: 11/927,245

(22) Filed: Oct. 29, 2007

(65) Prior Publication Data

US 2009/0112991 A1    Apr. 30, 2009

(51) Int. Cl.
| G06F 11/30 | (2006.01) |
| G06Q 10/10 | (2012.01) |
| H04L 12/58 | (2006.01) |
| H04L 29/06 | (2006.01) |
| H04L 12/24 | (2006.01) |

(52) U.S. Cl.
CPC .............. *G06Q 10/10* (2013.01); *G06Q 10/107* (2013.01); *H04L 12/2496* (2013.01); *H04L 12/581* (2013.01); *H04L 12/582* (2013.01); *H04L 12/586* (2013.01); *H04L 51/00* (2013.01); *H04L 51/046* (2013.01); *H04L 51/16* (2013.01); *H04L 65/4007* (2013.01); *H04L 65/4015* (2013.01)

(58) Field of Classification Search
CPC ..... H04L 12/58; H04L 12/581; H04L 12/582; H04L 12/586; H04L 12/5815; H04L 12/2496; H04L 51/00; H04L 51/16; H04L 51/04; H04L 51/046; H04L 65/4007; H04L 65/4015; H04L 65/4023; G06Q 10/10; G06Q 10/06; G06Q 10/107; G06Q 10/063114

USPC ................. 709/225, 227–229, 204–206, 224; 715/753, 758, 751, 752
See application file for complete search history.

(56) References Cited

U.S. PATENT DOCUMENTS

| 6,630,944 | B1 * | 10/2003 | Kakuta et al. | ................. 715/758 |
| 6,839,737 | B1 * | 1/2005 | Friskel | .......................... 709/206 |
| 7,512,659 | B2 * | 3/2009 | Keohane et al. | .............. 709/206 |
| 7,620,689 | B2 * | 11/2009 | LoBuono et al. | ............. 709/206 |
| 7,698,346 | B2 * | 4/2010 | Henderson | ..................... 707/781 |
| 7,707,254 | B2 * | 4/2010 | Daniell et al. | ................. 709/206 |
| 2003/0197730 | A1 * | 10/2003 | Kakuta et al. | .................. 345/758 |
| 2004/0064514 | A1 * | 4/2004 | Daniell et al. | ................. 709/206 |
| 2004/0078448 | A1 * | 4/2004 | Malik et al. | .................... 709/206 |
| 2004/0186896 | A1 * | 9/2004 | Daniell et al. | ................. 709/207 |
| 2006/0031331 | A1 * | 2/2006 | LoBuono et al. | ............. 709/206 |
| 2006/0101071 | A1 * | 5/2006 | Henderson | ................. 707/104.1 |
| 2006/0168026 | A1 * | 7/2006 | Keohane et al. | .............. 709/206 |

(Continued)

*Primary Examiner* — Kenneth R Coulter
(74) *Attorney, Agent, or Firm* — Steven M. Greenberg, Esq.; CRGO Law

(57) ABSTRACT

Embodiments of the present invention address deficiencies of the art in respect to discussion forum management and provide a method, system and computer program product for instant conversations in a thread within a discussion forum. In an embodiment of the invention, a method for instant conversations in a thread within a discussion forum can be provided. The method can include providing a discussion forum and initiating a thread in the discussion forum and measuring a temporal proximity of postings between two or more users in the thread. In response to determining a close temporal proximity, an instant messaging session can be launched between the two or more users and entries in the instant messaging session can be inserted as responses to the thread in the discussion forum.

13 Claims, 1 Drawing Sheet

(56) References Cited

U.S. PATENT DOCUMENTS

| | | | |
|---|---|---|---|
| 2006/0271381 A1* | 11/2006 | Pui | 705/1 |
| 2006/0285670 A1* | 12/2006 | Chin et al. | 379/201.01 |
| 2009/0006558 A1* | 1/2009 | Taieb et al. | 709/206 |
| 2009/0083380 A1* | 3/2009 | Smyth et al. | 709/206 |
| 2009/0083383 A1* | 3/2009 | Piper et al. | 709/206 |

* cited by examiner

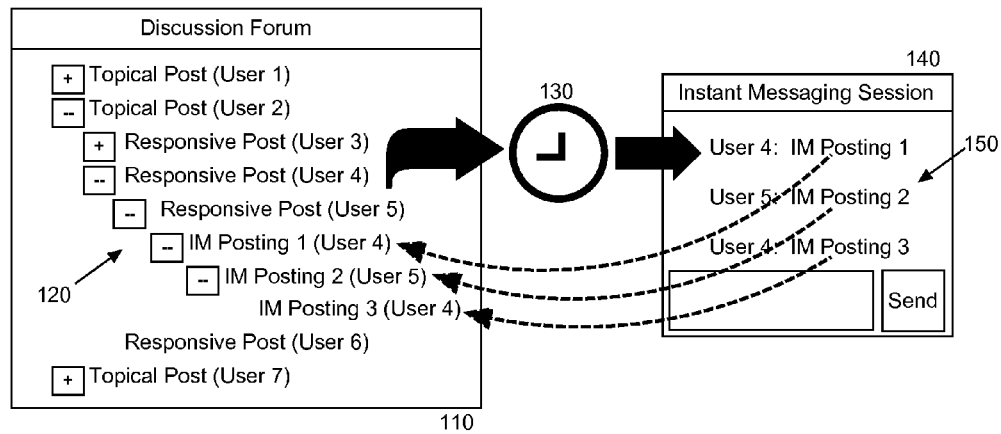
FIG. 1
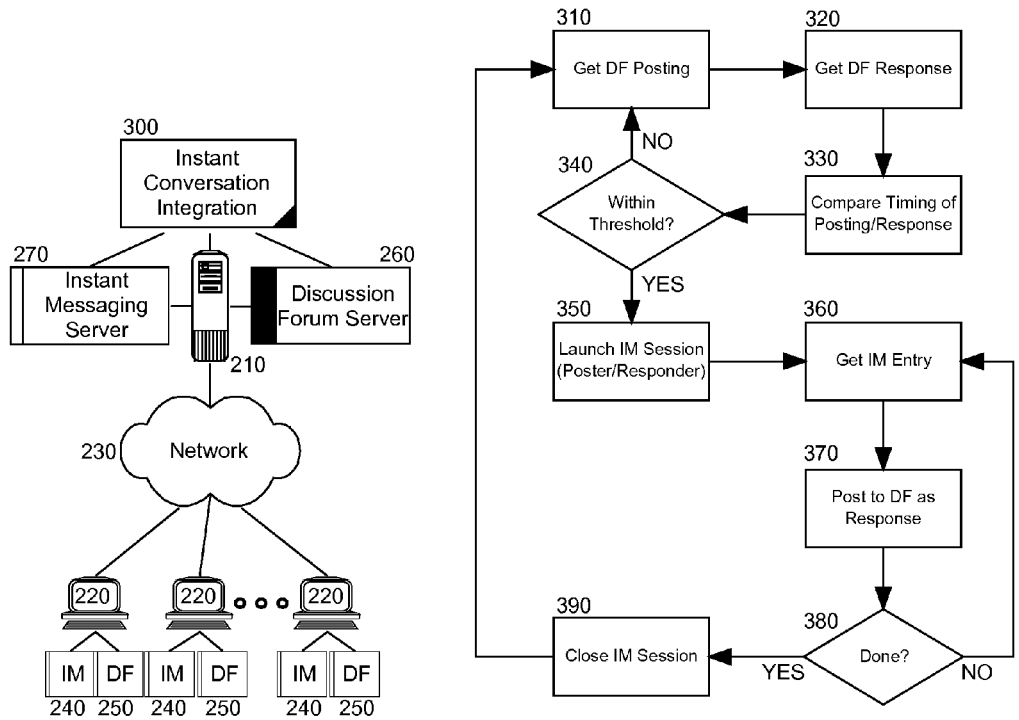
FIG. 2　　　　　　　　FIG. 3

INSTANT CONVERSATION IN A THREAD OF AN ONLINE DISCUSSION FORUM

BACKGROUND OF THE INVENTION

1. Field of the Invention

The present invention relates to the field of online discussion forum management and more particularly to the field of notification processing for postings to a thread of an online discussion forum.

2. Description of the Related Art

Several collaborative mechanisms subsist for supporting the activities of remotely disposed collaborators in a computing communications network environment. First and foremost, electronic mail (e-mail) has formed the backbone of asynchronous communications; however, e-mail alone cannot support an extended conversation amongst a group of participants with any degree of efficiency. Likewise, instant messaging, though synchronous in nature, cannot support an extended conversation amongst a group of participants with any degree of efficiency. The online discussion forum, however, has proven quite effective in coordinating an asynchronous conversation amongst a group of participants with great efficiency.

In an online discussion forum, a conversation for a particular topic can be established as a thread of postings by different collaborators. Individual responses to a posting can be viewed as nodal branches to the posting and responses to a response to a posting can be viewed as nodal branches to the response and so forth. Different topics of conversation, of course, can enjoy their own threads in order to provide a high degree of organization. In this way, collaborators can asynchronously view an entire conversation in hierarchical fashion with some sense of chronology for the postings. Several analogous forms of the online discussion forum include wikis and blogs.

In a discussion forum, when a collaborator provides a post to a thread, the collaborator must repeatedly return to the thread to determine whether or not a response has been provided to the post. Requiring collaborators to continuously return to a thread to detect a responsive posting can be inefficient however, though such is the nature of asynchronous communications. Notwithstanding, where a thread enjoys lively activity, the conversation can become near synchronous in nature. Despite the synchronous nature of such interactions, collaborators still must continuously return to the thread refreshing the view of the thread as the case may be in order to detect a response to a posting.

To address the need to manage near synchronous interactivity in a discussion forum, some collaborative tools permit collaborators to subscribe to a thread in a discussion forum and to be notified by e-mail upon detecting activity on the subscribed thread. Still, the subscriber must check e-mail often to determine whether or not a collaborator has responded to a posting. Additionally, the subscriber upon detecting a response must return to the thread to continue the conversation. As another, solution would, collaborators can initiate an instant messaging session with a poster of a response; however, the content of the instant messaging session will persist externally to the discussion forum depriving other collaborators of a record of the interactions in the instant messaging session.

BRIEF SUMMARY OF THE INVENTION

Embodiments of the present invention address deficiencies of the art in respect to discussion forum management and provide a novel and non-obvious method, system and computer program product for instant conversations in a thread within a discussion forum. In an embodiment of the invention, a method for instant conversations in a thread within a discussion forum can be provided. The method can include providing a discussion forum and initiating a thread in the discussion forum and measuring a temporal proximity of postings between two or more users in the thread. In response to determining a close temporal proximity, an instant messaging session can be launched between the two or more users and entries in the instant messaging session can be inserted as responses to the thread in the discussion forum.

Optionally, in one aspect of the embodiment, the method can include launching an instant messaging session between the two or more users and inserting entries in the instant messaging session as responses to the thread in the discussion forum in response not only to determining a close temporal proximity, but also to determining the two or more users to be available for instant messaging through presence awareness. In another aspect of the embodiment, launching an instant messaging session between the two or more users can include prompting the two or more users to launch an instant messaging session. In yet another aspect of the embodiment, inserting entries in the instant messaging session as responses to the thread in the discussion forum further can include selectably excluding private entries in the instant messaging session from insertion as responses in the thread in the discussion forum. Finally, in even yet a further aspect of the embodiment, the method can include measuring a duration of time between entries in the instant messaging session, and closing the instant messaging session and reverting to the discussion forum in response to the duration exceeding a threshold value.

In another embodiment of the invention, a discussion forum data processing system can be provided. The system can include an instant messaging server, a discussion forum server and instant conversation integration logic coupled to the instant messaging server and discussion forum server. The logic can include program code enabled to measure a temporal proximity of postings between two or more users in a thread in a discussion forum provided by the discussion forum server, and in response to determining a close temporal proximity, to launch an instant messaging session through the instant messaging server between the two or more users and to insert entries in the instant messaging session as responses to the thread in the discussion forum.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of discussion forum configured for an instant conversation in a thread;

FIG. 2 is a schematic illustration of a discussion forum management data processing system configured to support instant conversations in threads of a discussion forum; and, FIG. 3 is a flow chart illustrating a process for supporting instant conversations in threads of a discussion forum.

DETAILED DESCRIPTION OF THE INVENTION

Embodiments of the present invention provide a method, system and computer program product for instant conversations in a thread of a discussion forum. In accordance with an embodiment of the present invention, the temporal proximity of postings to a thread in a discussion forum between two or more users can be measured. To the extent that the temporal proximity falls below a threshold value, the two or more users can engage in an instant messaging session. The instant messaging session entries by the two or more users to the instant messaging session in turn can be inserted into the thread of the discussion forum as different responses in the thread. In this way, the two or more users can enjoy the real-time environment of an instant messaging session without compromising the communal aspects of the discussion forum by incorporating the instant messaging session entries of the instant messaging session into the discussion forum.

In illustration, FIG. 1 pictorially depicts a discussion forum configured for an instant conversation in a thread. As shown in FIG. 1, a discussion forum 110 can be provided to include multiple different postings 120. The postings 120 in the discussion forum 110 can be organized according to thread where each thread represents a different main topic. Responsive postings related to the topic of a thread can be provided below the thread in a hierarchical fashion as shown in FIG. 1. A timer 130 can be maintained to measure the timing of postings to each thread in the discussion forum 110. When the timing of responsive postings between two or more users falls below a threshold value indicating the temporal proximity of the responsive postings, an instant messaging session 140 can be launched as between the users.

Of course, in advance of launching the instant messaging session 140, it can be confirmed that the users are available to engage in an instant messaging session 140 through presence awareness. Once an instant messaging session 140 has been launched as between the two or more users, entries 150 to the instant messaging session 140 can be copied into the discussion forum as postings 120. In this way, those following the postings 120 of the discussion forum 110 can continue to monitor the progress of the thread irrespective of whether the two or more users converse through the instant messaging session 140 or through the discussion forum 110.

In more particular illustration, FIG. 2 schematically depicts a discussion forum management data processing system configured to support instant conversations in threads of a discussion forum. The system can include a host server 210 configured for communicative coupling to one or more clients 220 over computer communications network 230. The host server 210 can support the operation of both a discussion forum server 260 and an instant messaging server 270. Of course, it is to be recognized by the skilled artisan that each of the discussion forum server 260 and the instant messaging server 270 can be supported separately by different servers and need not be resident within a single server. The discussion forum server 260, in particular, can be configured to create and manage discussion forums each with different threads and postings organized in a hierarchical fashion. The clients 220, in turn each can be configured to support the operation of both an instant messaging client 240 and a discussion forum client 250.

Notably, instant conversation integration logic 300 can be coupled to both the discussion forum server 260 and the instant messaging server 270. The instant conversation integration logic 300 can include program code enabled to determine when postings to a thread in a discussion forum by two or more different users arise temporally proximately. The program code further can be enabled, in that circumstance, to determine whether or not both users are able to engage in an instant messaging session through the instant messaging server 270. Finally, the program code, in that circumstance, can be yet further enabled to prompt the users to engage in an instant messaging session through the instant messaging server 270.

During the instant messaging session, instant messaging session entries provided by each of the users can be posted into the discussion forum as responses in the thread. Specifically, each entry in the instant messaging session can be added to the thread in the discussion forum as a response, with each subsequent entry to the instant messaging session being treated as a response to the response in the discussion forum and so forth. Optionally, instant messaging session entries provided by each of the users can remain private and excluded from the discussion forum at the discretion of one or both of the end users. When a threshold period of time has elapsed between instant messaging session entries by the end users, the instant messaging session can be closed and further postings must be provided directly to the thread in the discussion forum.

In yet further illustration, FIG. 3 is a flow chart illustrating a process for supporting instant conversations in threads of a discussion forum. Beginning in block 310, a discussion forum posting to a thread can be identified and in block 320, a discussion forum response to the posting can be identified. In block 330, the timing of the posting and response can be compared to determine in block 340 whether the lapse of time between the posting and response falls within a threshold level. If so, in block 350 an instant messaging session can be launched as between the user providing the posting and another user providing the response.

In block 360, an instant messaging entry can be provided by either user and in block 370 the instant messaging entry can be posted to the discussion forum as a response in the thread. In decision block 380, it can be determine whether either of the users has discontinued conversing in the instant messaging session. If not, the process can return to block 360 with a new instant messaging entry. Otherwise, in block 390 the instant messaging session can be closed and the process can return to block 310 in which a next discussion forum posting is provided.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for instant conversations in a thread within a discussion forum, the method comprising:
   providing a discussion forum and initiating a thread in the discussion forum;
   measuring a temporal proximity of postings between two users in the thread by instant conversation logic stored in memory executed by at least one processor of a computer; and,
   responsive to determining a close temporal proximity in the instant conversation logic, launching an instant messaging session between the two users and inserting entries in the instant messaging session as responses to the thread in the discussion forum.

2. The method of claim 1, further comprising launching the instant messaging session between the two users and inserting entries in the instant messaging session as responses to the thread in the discussion forum in response not only to determining the close temporal proximity, but also to determining the two users to be available for instant messaging through presence awareness.

3. The method of claim 1, wherein launching an instant messaging session between the two users, comprises prompting the two users to launch the instant messaging session.

4. The method of claim 1, wherein inserting entries in the instant messaging session as responses to the thread in the discussion forum, further comprises selectably excluding private entries in the instant messaging session from insertion as responses in the thread in the discussion forum.

5. The method of claim 1, further comprising:
   measuring a duration of time between entries in the instant messaging session; and,
   closing the instant messaging session and reverting to the discussion forum in response to the duration exceeding a threshold value.

6. A discussion forum data processing system comprising:
   an instant messaging server;
   a discussion forum server; and,
   instant conversation integration logic coupled to the instant messaging server and discussion forum server, the instant conversation integration logic comprising program code enabled to measure a temporal proximity of postings between two users in a thread in a discussion forum provided by the discussion forum server, and in response to determining a close temporal proximity, to launch an instant messaging session through the instant messaging server between the two users and to insert entries in the instant messaging session as responses to the thread in the discussion forum.

7. The system of claim 6, wherein the discussion forum is a wiki.

8. The system of claim 6, wherein the discussion forum is a blog.

9. A computer program product comprising a non-transitory computer usable storage medium embodying computer usable program code for instant conversations in a thread within a discussion forum, the computer program product comprising:
   computer usable program code for providing a discussion forum and initiating a thread in the discussion forum;
   computer usable program code for measuring a temporal proximity of postings between two users in the thread; and,
   computer usable program code for launching an instant messaging session between the two users and inserting entries in the instant messaging session as responses to the thread in the discussion forum responsive to determining a close temporal proximity.

10. The computer program product of claim 9, further comprising computer usable program code for launching the instant messaging session between the two or more users and inserting entries in the instant messaging session as responses to the thread in the discussion forum in response not only to determining the close temporal proximity, but also to determining the two users to be available for instant messaging through presence awareness.

11. The computer program product of claim 9, wherein the computer usable program code for launching the instant messaging session between the two users, comprises computer usable program code for prompting the two users to launch the instant messaging session.

12. The computer program product of claim 9, wherein the computer usable program code for inserting entries in the instant messaging session as responses to the thread in the discussion forum, further comprises computer usable program code for selectably excluding private entries in the instant messaging session from insertion as responses in the thread in the discussion forum.

13. The computer program product of claim 9, further comprising:
   computer usable program code for measuring a duration of time between entries in the instant messaging session; and,
   computer usable program code for closing the instant messaging session and reverting to the discussion forum in response to the duration exceeding a threshold value.

* * * * *